US011731501B2

(12) United States Patent
Xiang et al.

(10) Patent No.: US 11,731,501 B2
(45) Date of Patent: Aug. 22, 2023

(54) LIQUID-COOLED INTEGRATIVE POWER SYSTEM FOR ELECTRIC FORKLIFT AND FORKLIFT

(71) Applicant: ANHUI WEIDE POWER SUPPLY CO.,LTD., Anhui (CN)

(72) Inventors: Shounan Xiang, Anhui (CN); Jian Chen, Anhui (CN)

(73) Assignee: ANHUI WEIDE POWER SUPPLY CO., LTD., Anhui (CN)

( * ) Notice: Subject to any disclaimer, the term of this patent is extended or adjusted under 35 U.S.C. 154(b) by 5 days.

(21) Appl. No.: 17/767,449

(22) PCT Filed: Apr. 16, 2021

(86) PCT No.: PCT/CN2021/087658
§ 371 (c)(1),
(2) Date: Apr. 8, 2022

(87) PCT Pub. No.: WO2022/041784
PCT Pub. Date: Mar. 3, 2022

(65) Prior Publication Data
US 2022/0396141 A1 Dec. 15, 2022

(30) Foreign Application Priority Data
Aug. 27, 2020 (CN) .......................... 202010879071.9

(51) Int. Cl.
*B60K 17/16* (2006.01)
*F16H 57/04* (2010.01)
(Continued)

(52) U.S. Cl.
CPC ................ *B60K 11/02* (2013.01); *B60K 1/00* (2013.01); *B60K 17/08* (2013.01); *B60K 17/16* (2013.01);
(Continued)

(58) Field of Classification Search
CPC .......... B60K 11/02; B60K 1/00; B60K 17/08; B60K 17/16; F16H 57/025;
(Continued)

(56) References Cited

U.S. PATENT DOCUMENTS 11,192,444 B2 * 12/2021 Hashimoto ........... B60W 10/30
2013/0270038 A1 * 10/2013 Nitta ....................... B60L 50/60
184/6
(Continued)

FOREIGN PATENT DOCUMENTS

CN 110002370 7/2019
CN 110054123 7/2019
(Continued)

OTHER PUBLICATIONS

"International Search Report (Form PCT/ISA/210) of PCT/CN2021/087658", dated Jul. 16, 2021, with English translation thereof, pp. 1-5.
(Continued)

Primary Examiner — Tinh Dang
(74) Attorney, Agent, or Firm — JCIPRNET

(57) ABSTRACT

A liquid-cooled integrative power system for electric forklift includes an integrated transmission gearbox, an integrated motor controller, a drive motor, an oil pump motor, an oil pump and a vehicle controller. The integrated transmission gearbox includes a drive motor transmission mechanism and an oil pump motor transmission mechanism. The integrated motor controller includes a drive motor control unit and an oil pump motor control unit. The integrated transmission gearbox, the integrated motor controller, the drive motor, the oil pump motor, the oil pump and the vehicle controller are completely integrated and mounted to form the liquid-cooled integrative power system for electric forklift.

7 Claims, 7 Drawing Sheets

(51) Int. Cl.
- *F16H 57/02* (2012.01)
- *F16H 37/08* (2006.01)
- *F16H 57/025* (2012.01)
- *B60K 11/02* (2006.01)
- *B60K 17/08* (2006.01)
- *H02K 9/19* (2006.01)
- *H02K 5/20* (2006.01)
- *B60K 1/00* (2006.01)
- *B60R 16/02* (2006.01)
- *B66F 9/075* (2006.01)
- *H02K 5/22* (2006.01)
- *H02K 7/00* (2006.01)
- *H02K 7/116* (2006.01)

(52) U.S. Cl.
CPC ...... *B60R 16/0207* (2013.01); *B66F 9/07572* (2013.01); *B66F 9/07595* (2013.01); *F16H 37/0813* (2013.01); *F16H 57/025* (2013.01); *F16H 57/0412* (2013.01); *F16H 57/0436* (2013.01); *F16H 57/0441* (2013.01); *H02K 5/203* (2021.01); *H02K 5/225* (2013.01); *H02K 7/003* (2013.01); *H02K 7/116* (2013.01); *H02K 9/19* (2013.01); *B60K 2001/006* (2013.01); *F16H 2057/02034* (2013.01); *F16H 2057/02052* (2013.01)

(58) Field of Classification Search
CPC ............. F16H 57/0436; F16H 57/0441; F16H 2057/02034; F16H 2057/02052; F16H 2001/006; F16H 57/0412; F16H 37/0813; H02K 5/203; H02K 5/225; H02K 7/003; H02K 7/116; H02K 9/19; B66F 9/07572; B66F 9/07595

See application file for complete search history.

(56) References Cited

U.S. PATENT DOCUMENTS

| | | | | |
|---|---|---|---|---|
| 2014/0175867 | A1* | 6/2014 | Sung | F16H 57/0412 307/9.1 |
| 2017/0175612 | A1* | 6/2017 | Tokozakura | F01P 7/14 |
| 2017/0285062 | A1* | 10/2017 | Kim | F16H 57/0435 |
| 2018/0334025 | A1* | 11/2018 | Hashimoto | B60K 1/02 |
| 2020/0106337 | A1 | 4/2020 | Devaraj et al. | |

FOREIGN PATENT DOCUMENTS

| | | | |
|---|---|---|---|
| CN | 110054123 A | * | 7/2019 |
| CN | 110790195 | | 2/2020 |
| CN | 110894053 | | 3/2020 |
| CN | 111976469 | | 11/2020 |

OTHER PUBLICATIONS

"Written Opinion of the International Searching Authority (Form PCT/ISA/237) of PCT/CN2021/087658", dated Jul. 16, 2021, pp. 1-4.

* cited by examiner

LIQUID-COOLED INTEGRATIVE POWER SYSTEM FOR ELECTRIC FORKLIFT AND FORKLIFT

CROSS-REFERENCE TO RELATED APPLICATION

This application is a 371 of international application of PCT application serial no. PCT/CN2021/087658, filed on Apr. 16, 2021, which claims the priority benefit of China application no. 202010879071.9, filed on Aug. 27, 2020. The entirety of each of the above mentioned patent applications is hereby incorporated by reference herein and made a part of this specification.

TECHNICAL FIELD

The present invention relates to the field of electric industrial vehicle technologies, and in particular, to a liquid-cooled integrative power system for electric forklift and a forklift.

DESCRIPTION OF RELATED ART

The industrial vehicle market in China has a broad development space. In particular, an electric forklift market has great potential. With the continuous development of economy, higher requirements are put forward for an electric forklift drive and hydraulic power system.

The existing electric forklift drive and hydraulic power system has a single technical route, in which a walking power unit basically consists of a drive motor and a front axle reducer, a hydraulic power unit consists of an oil pump motor and an oil pump, and a motor control unit consists of a drive motor controller and an oil pump motor controller arranged separately. The whole power system adopts wide-range distributed arrangement, in which the walking power unit is arranged at a front axle of a vehicle body, the hydraulic power unit is arranged in the middle or at the rear of the vehicle body, and the motor control unit is arranged in the middle or at the rear of the vehicle body. In such a system, both the walking power unit and the hydraulic power unit are far away from the motor control unit, and thus the connecting cables are too long, which is not conducive to the assembly of the whole vehicle. Moreover, an excessive length of the cable may increase costs, affect power efficiency, and eventually lead to a significant increase in energy consumption of the vehicle. The drive and hydraulic power system with wide-range distributed arrangement is heat-dissipated complexly and inefficiently, each unit is required to be separately cooled or heat-dissipated, and most are heat-dissipated by natural conduction or forced wind-cooling, resulting in a complex structure, a poor heat-dissipation effect and a significant increase in cost.

Thus, an integrative power system, with a highly integrated structure and capable of realizing integrated arrangement and efficient heat-dissipation, is needed for the electric forklift drive and hydraulic power system, so as to reduce system costs and improve system efficiency.

SUMMARY

In order to overcome the above technical problems, an objective of the present invention is to provide a liquid-cooled integrative power system for electric forklift and a forklift.

The objective of the present invention may be achieved through the following technical solutions.

A liquid-cooled integrative power system for electric forklift includes an integrated transmission gearbox, a drive motor, an oil pump motor, an integrated motor controller, an oil pump and a vehicle controller;

the integrated transmission gearbox includes a drive motor transmission mechanism and an oil pump motor transmission mechanism; the drive motor transmission mechanism is arranged inside the integrated transmission gearbox, the drive motor transmission mechanism includes a plurality of sets of gear shafts arranged in parallel, mating gears on each set of gear shafts engaging with each other, a first input gear shaft of the first-stage is provided with a first spline, a first output gear shaft of the last-stage is provided with a differential, and each gear shaft of the drive motor transmission mechanism is arranged on a housing of the integrated transmission gearbox through a bearing; the oil pump motor transmission mechanism is arranged inside the integrated transmission gearbox, the oil pump motor transmission mechanism includes a plurality of sets of gear shafts arranged in parallel, mating gears on each set of gear shafts engage with each other, a second input gear shaft of the first-stage and a second output gear shaft of the last-stage are respectively provided with a second spline and a third spline, and each gear shaft of the oil pump motor transmission mechanism is arranged on the housing of the integrated transmission gearbox through a bearing;

the drive motor is fixed to a lateral side of the integrated transmission gearbox through a mounting bolt on a rear cover of the motor, and an output shaft of the drive motor is connected, through a spline, to the first spline on the input gear shaft of the first-stage on the drive motor transmission mechanism;

the oil pump motor is fixed to the lateral side of the integrated transmission gearbox through a mounting bolt on a rear cover of the motor, and an output shaft of the oil pump motor is connected, through a spline, to the second spline on the input gear shaft of the first-stage on the oil pump motor transmission mechanism;

the integrated motor controller is fixedly mounted to an upper side of the drive motor, the oil pump motor and the integrated transmission gearbox;

the oil pump is fixedly mounted to the lateral side of the integrated transmission gearbox, and an input shaft of the oil pump is connected to, through a spline, the third spline on the output gear shaft of the last-stage on the oil pump motor transmission mechanism;

the vehicle controller is fixedly mounted to an upper cover of the integrated motor controller, and the vehicle controller is electrically connected to the integrated motor controller by wire harness; and the integrated transmission gearbox is provided with a mounting flange plate, a first bolt hole and a second bolt hole.

As a further solution of the present invention, the integrated motor controller includes a drive motor controller and an oil pump motor controller; a three-phase terminal of the drive motor controller and a three-phase terminal on the rear cover of the drive motor are directly connected inside a housing of the integrated motor controller through a copper bar; a low-voltage signal terminal of the drive motor controller and a low-voltage signal terminal on the rear cover of the drive motor are directly connected inside the housing of the integrated motor controller through a mating plug-in connector; a three-phase terminal of the oil pump motor controller and a three-phase terminal on the rear cover of the oil pump motor are directly connected inside the housing of the integrated motor controller through a copper bar; and a low-voltage signal terminal of the oil pump motor controller and a low-voltage signal terminal on the rear cover of the oil pump motor are directly connected inside the housing of the integrated motor controller through a mating plug-in connector.

As a further solution of the present invention, the mounting flange plate is fixedly connected to a gear casing and a mounting surface on a forklift drive axle housing, and the first bolt hole and the second bolt hole are fixedly connected to a support on a forklift body.

As a further solution of the present invention, a first heat-dissipation water channel is arranged inside a housing of the drive motor, and a first water inlet and a first water outlet of the first heat-dissipation water channel are arranged on the rear cover of the drive motor; a second heat-dissipation water channel is arranged inside a housing of the oil pump motor, a second water outlet of the second heat-dissipation water channel is arranged on the rear cover of the motor, and a second water inlet of the second heat-dissipation water channel is arranged on a front cover of the motor; a third heat-dissipation water channel is arranged at a bottom of the integrated motor controller, and a third water inlet and a third water outlet of the third heat-dissipation water channel are arranged on one side of the integrated motor controller; the third water outlet on one side of the integrated motor controller and the second water inlet on the front cover of the oil pump motor are connected through a first heat-dissipation pipeline, and the second water outlet on the rear cover of the oil pump motor and the first water inlet on the rear cover of the drive motor are connected through a second heat-dissipation pipeline; the third water inlet on one side of the integrated motor controller and a water outlet of an external cooling system are connected through a third heat-dissipation pipeline; and the first water outlet on the rear cover of the drive motor and a water inlet of the external cooling system are connected through a fourth heat-dissipation pipeline.

As a further solution of the present invention, the drive motor transmission mechanism includes the first input gear shaft, a second shaft, a third shaft and a first output shaft arranged in parallel; the first input gear shaft, the second shaft, the third shaft and the first output shaft are all fixedly mounted on the housing of the integrated transmission gearbox through bearings; the first input gear shaft is fixedly connected with a input shaft gear, the second shaft is fixedly connected with a first-stage reduction driven gear and a second-stage reduction driving gear, the third shaft is fixedly connected with a second-stage reduction driven gear and a third-stage reduction driving gear, and the first output shaft is fixedly connected with a third-stage reduction driven gear; the input shaft gear engages with the first-stage reduction driven gear in a transmission manner, the second-stage reduction driving gear engages with the second-stage reduction driven gear in a transmission manner, and the third-stage reduction driving gear engages with the third-stage reduction driven gear in a transmission manner; the first input gear shaft is provided with the first spline, and the first output shaft is provided with the differential.

As a further solution of the present invention, the oil pump motor transmission mechanism includes the second input gear shaft and the second output gear shaft arranged in parallel; the second input gear shaft and the second output gear shaft are both fixedly mounted on the housing of the integrated transmission gearbox through bearings; the second input gear shaft is fixedly connected with an input shaft gear, and the input gear shaft is fixedly connected with an output shaft gear; the input shaft gear engages with the output shaft gear in a transmission manner; and the input gear shaft and the second output gear shaft are respectively provided with the second spline and the third spline.

As a further solution of the present invention, the integrated motor controller is provided with a DC high-voltage positive and negative pole plug-in connector, and a signal plug-in connector of a low-voltage control signal; and an upper cover of the integrated motor controller is provided with an overhaul and disassembly cover plate, and a cover-open switch is arranged below the overhaul and disassembly cover plate.

The present invention has the following beneficial effects.

(1) According to the present invention, the power system of the electric forklift may be highly integrated, compactly arranged, and completely integrated into a unified whole structure without distributed arrangement, have a simple structure, and facilitate the assembly of the vehicle, which greatly improves the integration and reliability of the power system.

(2) According to the present invention, in an electric forklift drive and hydraulic integrative power system, the external connecting cables between the motor and the motor controller are completely eliminated, with the length of the cables being significantly reduced, so as to reduce resistance caused by the excessive length of the cable and improve operation efficiency of the power system while reducing assembly and mounting procedures. And at the same time, the external connecting cables are eliminated to improve insulation safety and electrical safety performance of the vehicle and prolong the safety operation period of the electric forklift.

(3) According to the present invention, a liquid cooling form of an integrated series water channel is set to perform forced liquid cooling for the motor and the motor controller, which greatly reduces temperature rise of the electric forklift drive and hydraulic integrative power system, improves the reliability of the integrative power system, prolongs the service life, and meets more stringent requirements of the electric forklift.

Another objective of the present invention is to provide an electric forklift, to optimize a layout space and a heat dissipation effect of the power system of the existing forklift. In order to achieve the objective, the technical solution of the present invention is achieved as follows. The electric forklift includes the liquid-cooled integrative power system for electric forklift described above.

The electric forklift and the integrative power system for electric forklift have same advantages over the prior art, which are not described in detail herein.

DESCRIPTION OF THE EMBODIMENTS

The technical solutions according to the embodiments of the present invention will be described clearly and completely below with reference to the accompanying drawings in the embodiments of the present invention. Apparently, the described embodiments are merely some of rather than all of the embodiments of the present invention. All other embodiments acquired by those skilled in the art without creative efforts based on the embodiments of the present invention shall fall within the protection scope of the present application.

Figure 1:
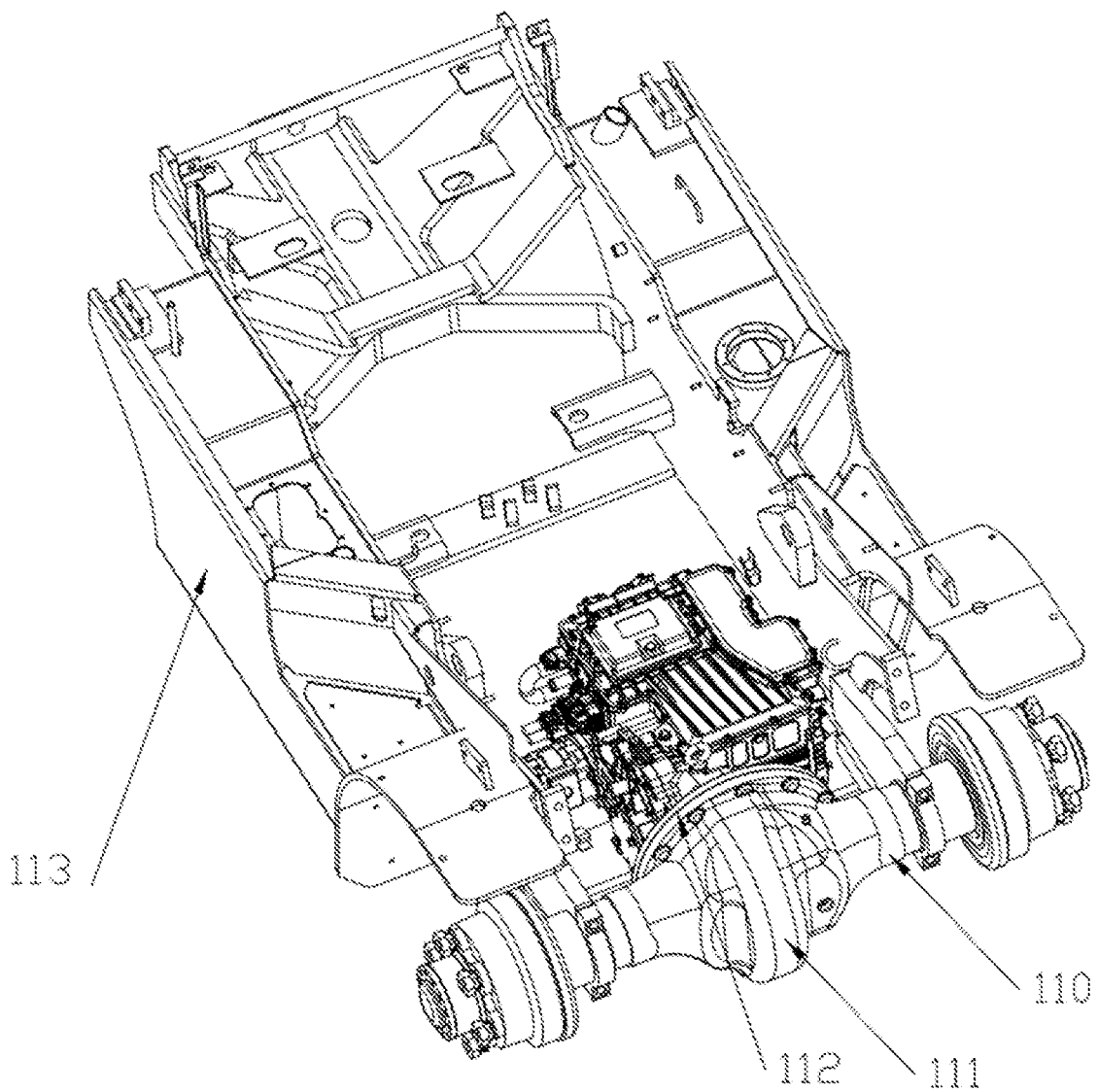
FIG. 1 is a schematic structural diagram of mounting of a liquid-cooled integrative power system for electric forklift according to the present invention, being mounted in a forklift chassis.
Figure 2:
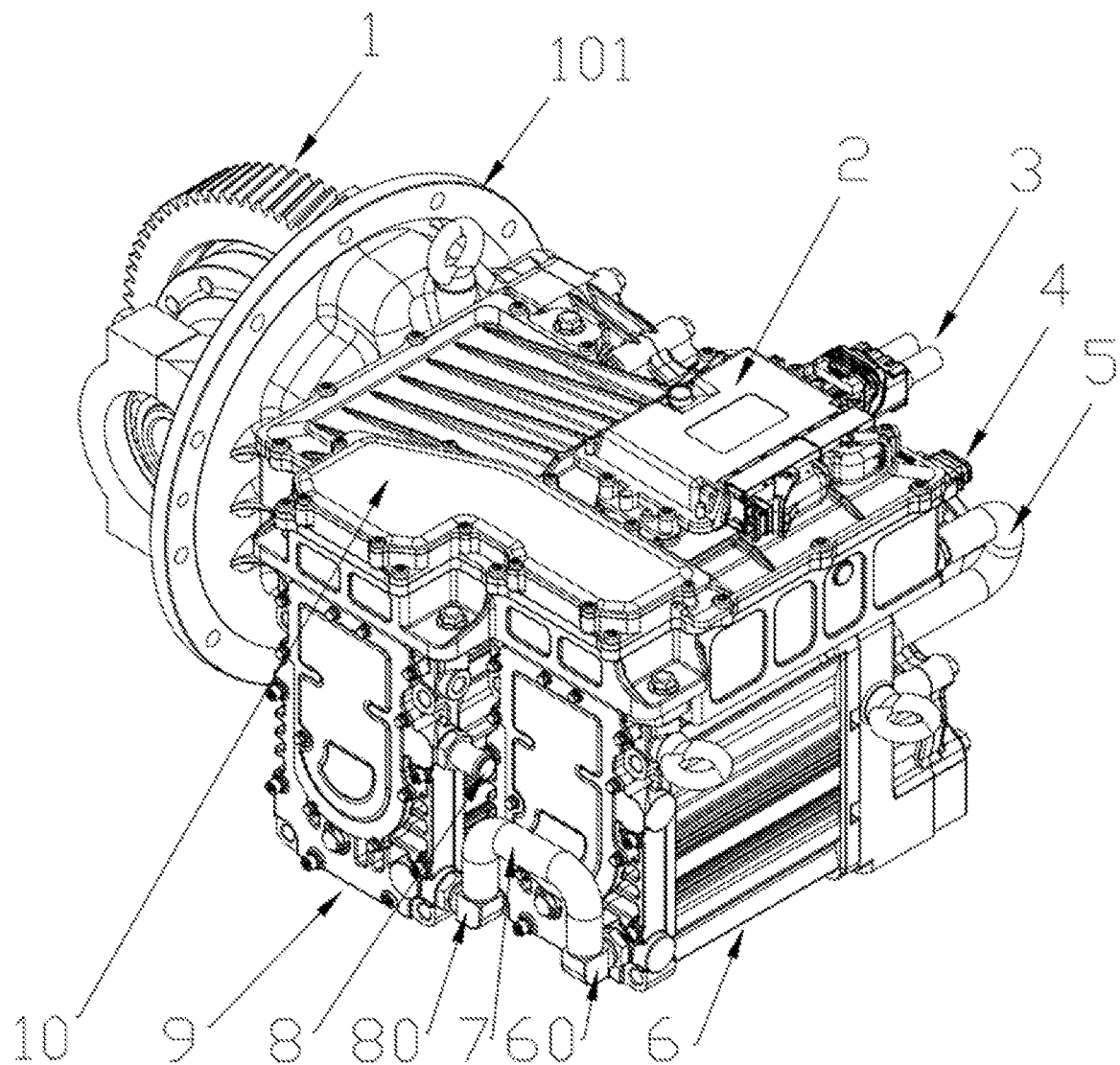
FIG. 2 is an overall schematic diagram of the liquid-cooled integrative power system for electric forklift according to the present invention.
Figure 3:
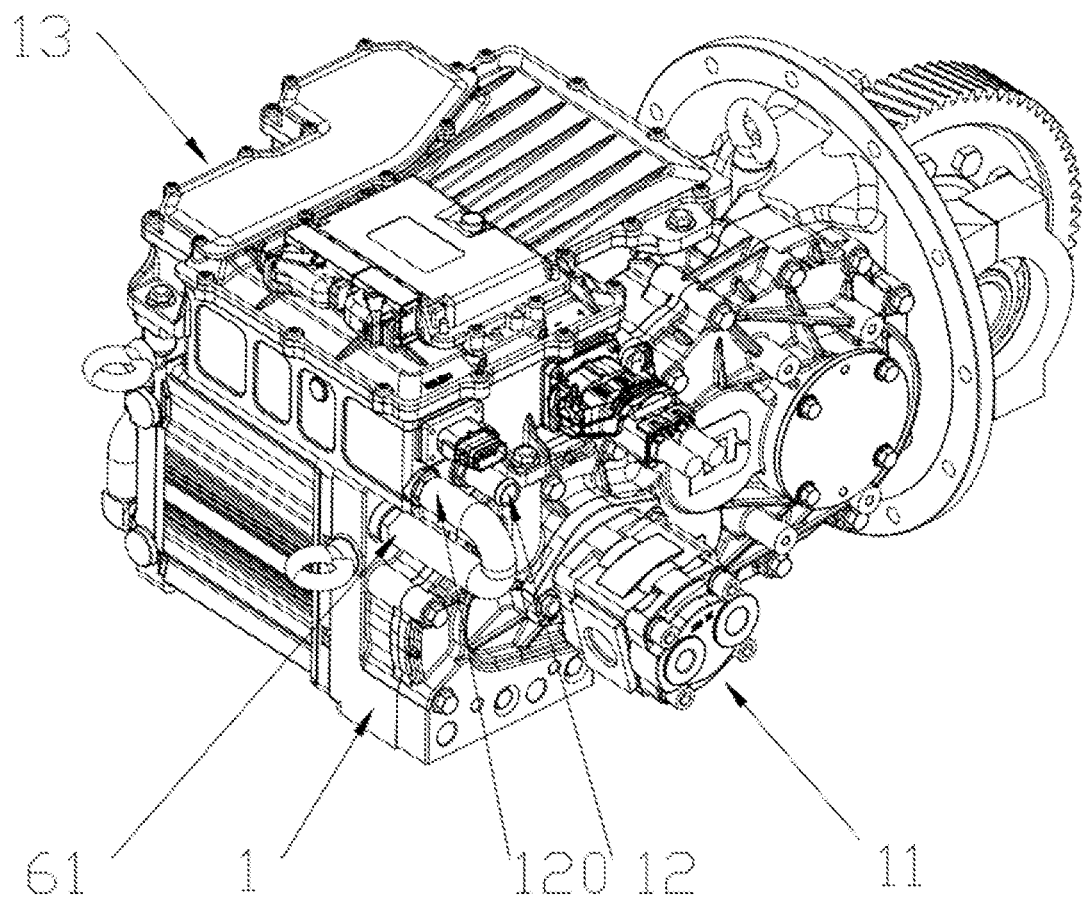
FIG. 3 is an overall schematic diagram of the liquid-cooled integrative power system for electric forklift according to the present invention.
Figure 4:
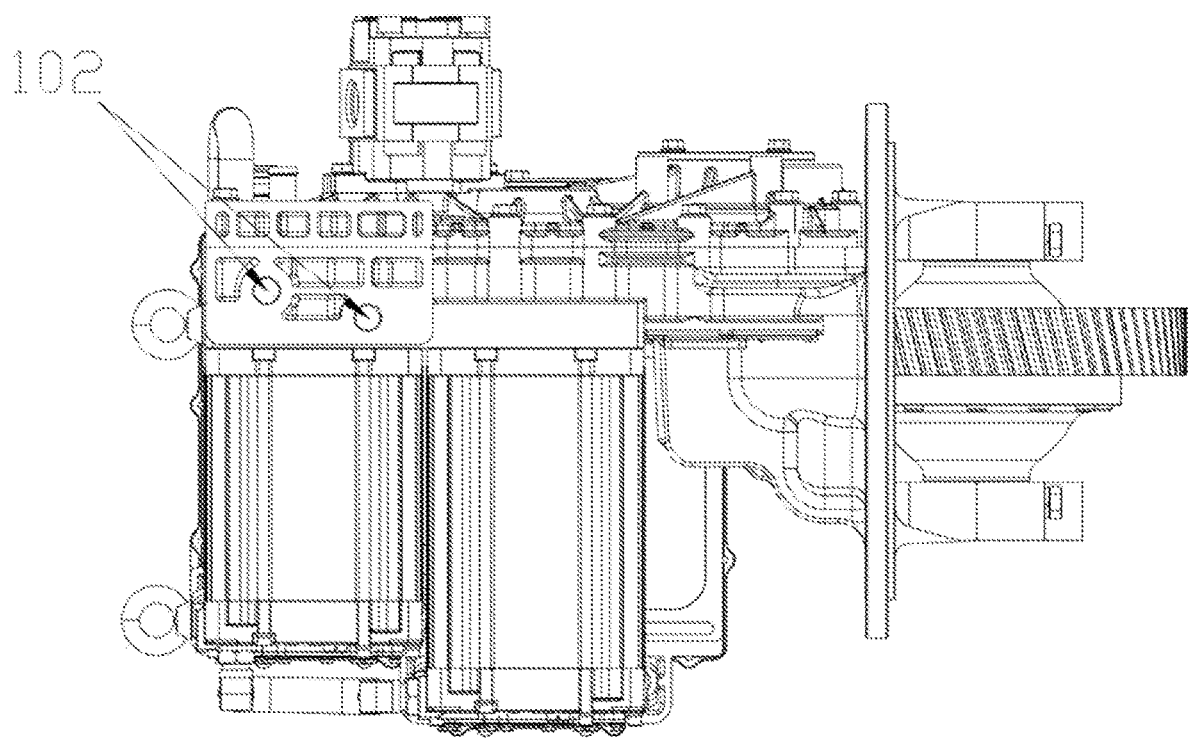
FIG. 4 is an overall bottom view of the liquid-cooled integrative power system for electric forklift according to the present invention.
Figure 5:
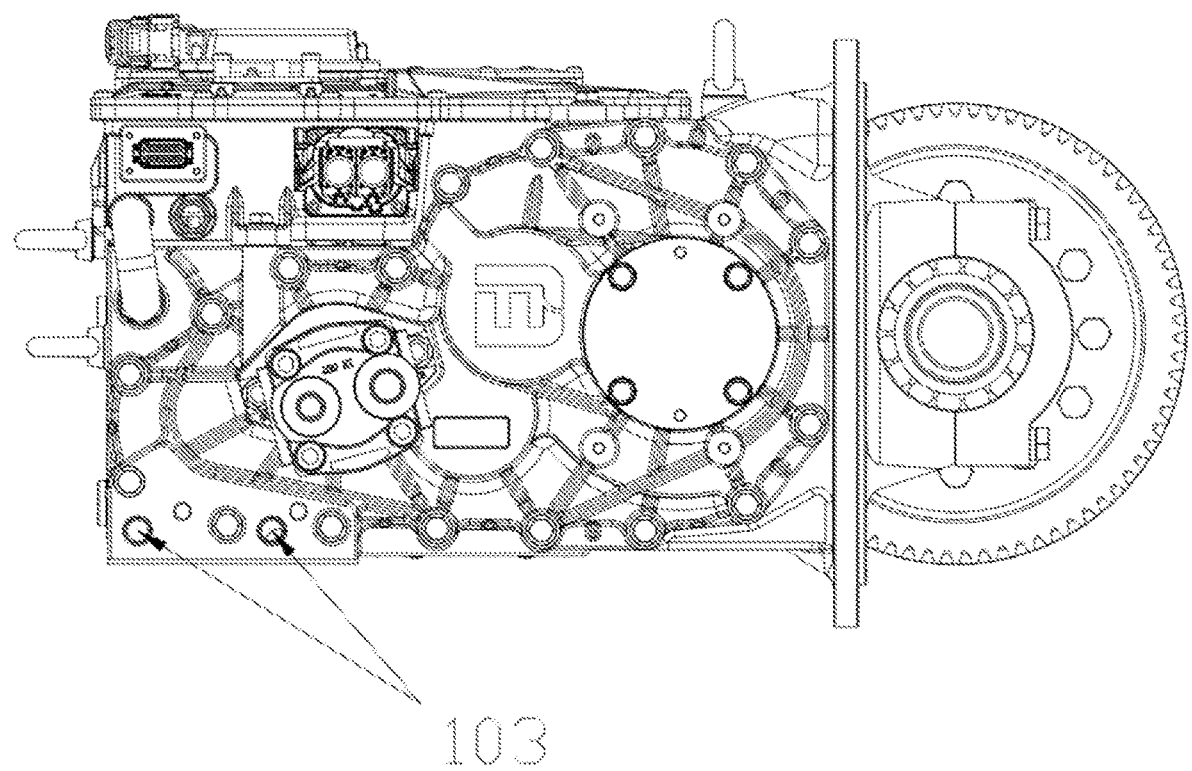
FIG. 5 is an overall side view of the liquid-cooled integrative power system for electric forklift according to the present invention.
Figure 6:
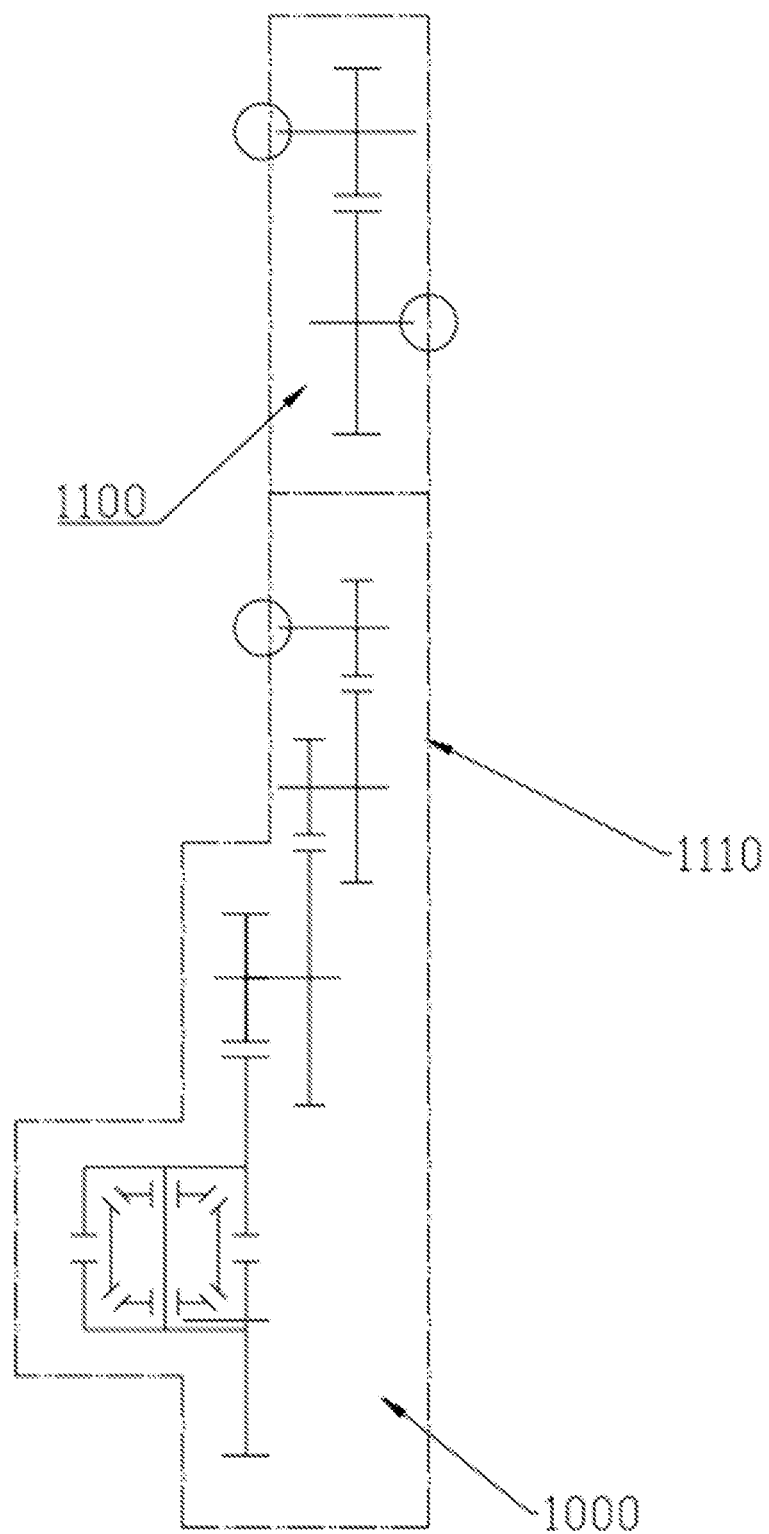
FIG. 6 is a schematic structural diagram of an integrated transmission gearbox according to the present invention.
Figure 7:
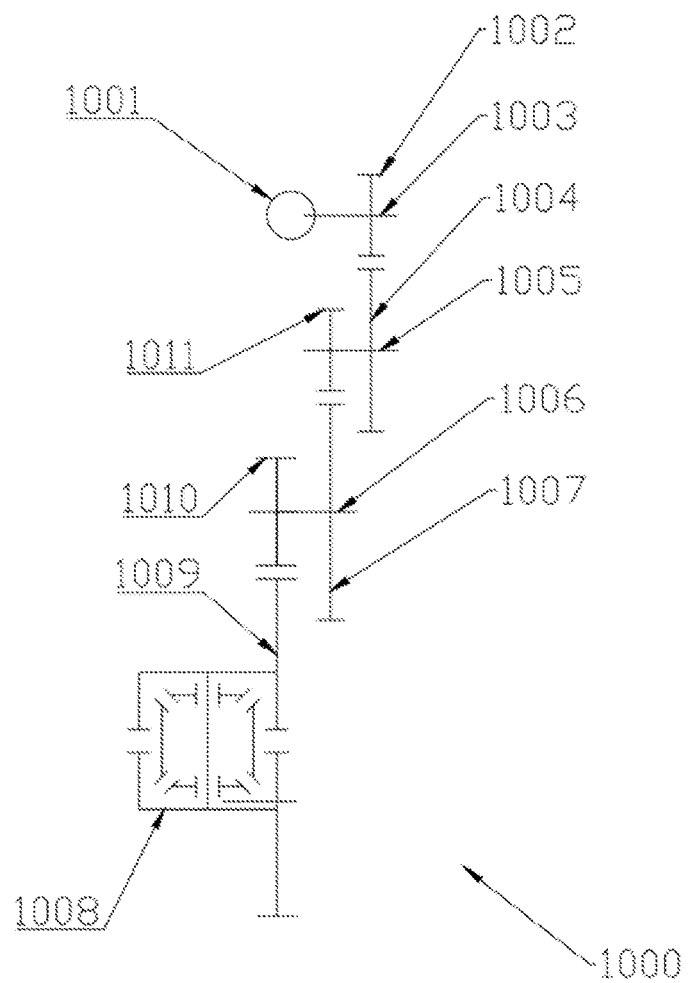
FIG. 7 is a schematic structural diagram of a drive motor transmission mechanism according to the present invention.
Figure 8:
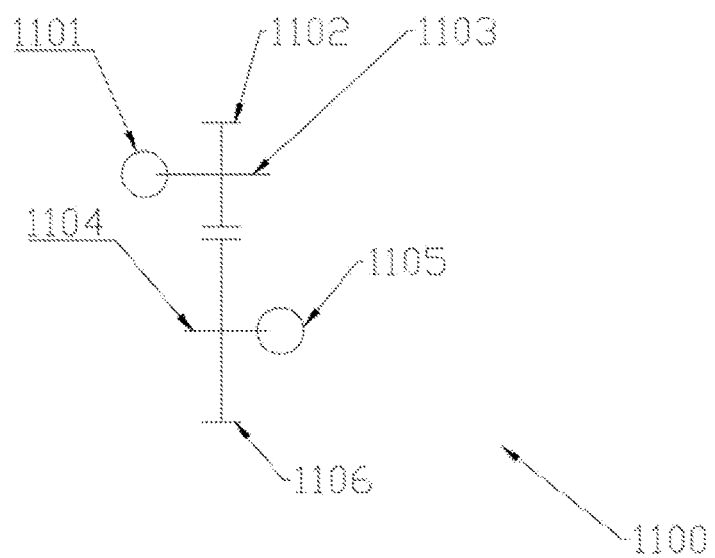
FIG. 8 is a schematic structural diagram of an oil pump motor transmission mechanism according to the present invention.

Referring to FIG. 1 to FIG. 8, a liquid-cooled integrative power system for electric forklift includes an integrated transmission gearbox 1, a drive motor 9, an oil pump motor 6, an integrated motor controller 13, an oil pump 11 and a vehicle controller 2.

The integrated transmission gearbox 1 includes a drive motor transmission mechanism 1000 and an oil pump motor transmission mechanism 1100. The drive motor transmission mechanism 1000 is arranged inside the integrated transmission gearbox 1. The drive motor transmission mechanism 1000 is of a parallel shaft-type reducer structure. The drive motor transmission mechanism 1000 includes a plurality of sets of gear shafts arranged in parallel, mating gears on each set of gear shafts engage with each other, a first input gear shaft 1003 of the first-stage is provided with a first spline 1001, a first output gear shaft 1009 of the last-stage is provided with a differential 1008, and each gear shaft of the drive motor transmission mechanism 1000 is arranged on a housing 1110 of the integrated transmission gearbox 1 through a bearing. The oil pump motor transmission mechanism 1100 is arranged inside the integrated transmission gearbox 1. The oil pump motor transmission mechanism 1100 is of a parallel shaft-type reducer structure. The oil pump motor transmission mechanism 1100 includes a plurality of sets of gear shafts arranged in parallel, mating gears on each set of gear shafts engage with each other, a second input gear shaft 1103 of the first-stage and a second output gear shaft 1104 of the last-stage are respectively provided with a second spline 1101 and a third spline 1105, and each gear shaft of the oil pump motor transmission mechanism 1100 is arranged on the housing 1110 of the integrated transmission gearbox 1 through a bearing.

The drive motor 9 is fixed to a lateral side of the integrated transmission gearbox 1 through a mounting bolt on a rear cover of the motor, and an output shaft of the drive motor 9 is connected to the first spline 1001 on the first input gear shaft 1003 of the first-stage on the drive motor transmission mechanism 1000 through a spline.

The oil pump motor 6 is fixed to a lateral side of the integrated transmission gearbox 1 through a mounting bolt on a rear cover of the motor, the oil pump motor 6 is disposed at a side of the drive motor 9, and an output shaft of the oil pump motor 6 is connected to the second spline 1101 on the second input gear shaft 1103 of the first-stage on the oil pump motor transmission mechanism 1100 through a spline.

The integrated motor controller 13 is fixedly mounted to an upper side of the drive motor 9, the oil pump motor 6 and the integrated transmission gearbox 1.

The oil pump 11 is fixedly mounted to a lateral side of the integrated transmission gearbox 1, and an input shaft of the oil pump 11 is connected to the third spline 1105 on the output gear shaft 1104 of the last-stage on the oil pump motor transmission mechanism 1100 through a spline.

The vehicle controller 2 is fixedly mounted to an upper cover of the integrated motor controller 13, and the vehicle controller 2 is electrically connected to the integrated motor controller 13 by wire harness.

The integrated transmission gearbox 1 is provided with a mounting flange plate 101, a first bolt hole 102 and a second bolt hole 103.

The integrated motor controller 13 includes a drive motor controller and an oil pump motor controller. A three-phase terminal of the drive motor controller and a three-phase terminal on the rear cover of the drive motor 9 are directly connected inside a housing of the integrated motor controller 13 through a copper bar. A low-voltage signal terminal of the drive motor controller and a low-voltage signal terminal on the rear cover of the drive motor 9 are directly connected inside the housing of the integrated motor controller 13 through a mating plug-in connector. A three-phase terminal of the oil pump motor controller and a three-phase terminal on the rear cover of the oil pump motor 6 are directly connected inside the housing of the integrated motor controller 13 through a copper bar. A low-voltage signal terminal of the oil pump motor controller and a low-voltage signal terminal on the rear cover of the oil pump motor 6 are directly connected inside the housing of the integrated motor controller 13 through a mating plug-in connector.

The mounting flange plate 101 is fixedly connected to a gear casing 111 and a mounting surface 112 on a forklift drive axle housing 110, and the first bolt hole 102 and the second bolt hole 103 are fixedly connected to a support on a forklift body 113, one of which may be selected according to an actual mounting state of the forklift, improving mounting adaptability of the integrative power system.

The above components are designed for the overall structure, are integratedly assembled, and finally form an integrative power system with a compact exterior envelope size, which is arranged on the forklift in such an assembled way.

A first heat-dissipation water channel is arranged inside a housing of the drive motor 9, and a first water inlet 80 and a first water outlet 8 of the first heat-dissipation water channel are arranged on the rear cover of the drive motor 9. A second heat-dissipation water channel is arranged inside a housing of the oil pump motor 6, a second water outlet 60 of the second heat-dissipation water channel is arranged on the rear cover of the motor 6, and a second water inlet 61 of the second heat-dissipation water channel is arranged on a front cover of the motor 6. A third heat-dissipation water channel is arranged at the bottom of the integrated motor controller 13, and a third water inlet 12 and a third water outlet 120 of the third heat-dissipation water channel are arranged on one side of the integrated motor controller 13. The third water outlet 120 on the side of the integrated motor controller 13 and the second water inlet 61 on the front cover of the oil pump motor 6 are connected through a first heat-dissipation pipeline 5, and the second water outlet 60 on the rear cover of the oil pump motor 6 and the first water inlet 80 on the rear cover of the drive motor 9 are connected through a second heat-dissipation pipeline 7. The third water inlet 12 on the side of the integrated motor controller 13 and a water outlet of an external cooling system are connected through a third heat-dissipation pipeline. The first water outlet 8 on the rear cover of the drive motor 9 and a water inlet of the external cooling system are connected through a fourth heat-dissipation pipeline. In this way, circulation of series heat-dissipation water channels for the motor and the motor controller is formed.

The drive motor transmission mechanism 1000 includes the first input gear shaft 1003, a second shaft 1005, a third shaft 1006 and a first output shaft arranged in parallel. The first input gear shaft 1003, the second shaft 1005, the third shaft 1006 and the first output shaft are all fixedly mounted on the housing 1110 of the integrated transmission gearbox 1 through bearings. The first input gear shaft 1003 is fixedly connected with a input shaft gear 1002, the second shaft 1005 is fixedly connected with a first-stage reduction driven gear 1004 and a second-stage reduction driving gear 1011, the third shaft 1006 is fixedly connected with a second-stage reduction driven gear 1007 and a third-stage reduction driving gear 1010, and the first output shaft is fixedly connected with a third-stage reduction driven gear. The input shaft gear 1002 engages with the first-stage reduction driven gear 1004 in a transmission manner, the second-stage reduction driving gear 1011 engages with the second-stage reduction driven gear 1007 in a transmission manner, and the third-stage reduction driving gear 1010 engages with the third-stage reduction driven gear in a transmission manner. The first input gear shaft 1003 is provided with the first spline 1001, and the first output shaft is provided with the differential 1008.

The oil pump motor transmission mechanism 1100 includes the second input gear shaft 1103 and the second output gear shaft 1104 arranged in parallel. The second input gear shaft 1103 and the second output gear shaft 1104 are both fixedly mounted on the housing 1110 of the integrated transmission gearbox 1 through bearings. The second input gear shaft 1103 is fixedly connected with an input shaft gear 1102, and the second output gear shaft 1104 is fixedly connected with an output shaft gear 1106. The input shaft gear 1102 engages with the output shaft gear 1106 in a transmission manner. The second input gear shaft 1103 and the second output gear shaft 1104 are respectively provided with the second spline 1101 and the third spline 1105. The first input-shaft spline 1001 of the drive motor transmission mechanism 1000 and the second input-shaft spline 1101 of the oil pump motor transmission mechanism 1100 serve as power input interfaces of the integrated transmission gearbox 1. The differential 1008 on the output shaft of the drive motor transmission mechanism 1000 serves as a drive power output interface of the integrated transmission gearbox 1. The third output-shaft spline 1105 of the oil pump motor transmission mechanism 1100 serves as a hydraulic power output interface of the integrated transmission gearbox 1.

The integrated motor controller 13 is provided with an independent positive and negative pole plug-in connector 3 externally connected to a DC high voltage and an independent signal plug-in connector 4 externally connected to a low-voltage control signal. An upper cover of the integrated motor controller 13 is provided with an overhaul and disassembly cover plate 10, and a cover-open switch is arranged below the overhaul and disassembly cover plate 10. After the overhaul and disassembly cover plate 10 is opened, the integrated motor controller 13 can be separated from the drive motor 9 and the oil pump motor 6 by simply removing a three-phase harness connecting bolt and a low-voltage control harness connector, which facilitates disassembly. At the same time, with the cover-open switch arranged below the overhaul and disassembly cover plate 10, a high voltage of the system can be cut off during live operation, to ensure electrical safety during the operation.

The working principle of the present invention is as follows. According to the present invention, the power system of the electric forklift may be highly integrated, compactly arranged, and completely integrated into a unified whole structure without distributed arrangement, have a simple structure, and facilitate the assembly of the vehicle, which greatly improves the integration and reliability of the power system. At the same time, according to the present invention, in an electric forklift drive and hydraulic integrative power system, the external connecting cables between the motor and the motor controller are completely eliminated, the length of the cables is significantly reduced to reduce resistance caused by the excessive length of the cable and improve operation efficiency of the power system while reducing assembly and mounting procedures, and at the same time, the external connecting cables are eliminated to improve insulation safety and electrical safety performance of the vehicle and prolong the safety operation time of the electric forklift. In addition, according to the present invention, a liquid cooling form of an integrated series water channel is set to perform forced liquid cooling for the motor and the motor controller, which greatly reduces temperature rise of the electric forklift drive and hydraulic integrative power system, improves the reliability of the integrative power system, prolongs the service life, and meets more stringent requirements of the electric forklift.

In the description of the present specification, reference throughout this specification to "an embodiment", "example", "specific example" and the like means that a particular feature, structure, material, or characteristic described in connection with the embodiment or example is included in at least one embodiment or example of the present invention. In the specification, the schematic expressions to the above-mentioned terms are not necessarily referring to the same embodiment or example. Furthermore, the described particular features, structures, materials, or characteristics may be combined in any suitable manner in one or more embodiments or examples.

The above contents are only examples and illustrations of the present invention. Various modifications, supplements or alternatives in a similar way may be made to the particularly described embodiments by those skilled in the art, which may fall within the protection scope of the present application provided that such modifications, supplements or alternatives do not depart from the present invention and go beyond the scope defined in the appended claims.

What is claimed is:

1. A liquid-cooled integrative power system for electric forklift, the liquid-cooled integrative power system comprising an integrated transmission gearbox, a drive motor, an oil pump motor, an integrated motor controller, an oil pump and a vehicle controller;

wherein the integrated transmission gearbox comprises a drive motor transmission mechanism and an oil pump motor transmission mechanism; the drive motor transmission mechanism is arranged inside the integrated transmission gearbox, the drive motor transmission mechanism comprises a plurality of sets of gear shafts arranged in parallel, mating gears on each set of gear shafts engage with each other, a first input gear shaft is provided with a first spline, an output gear shaft is provided with a differential, and each gear shaft of the drive motor transmission mechanism is arranged on a housing of the integrated transmission gearbox through a bearing; the oil pump motor transmission mechanism is arranged inside the integrated transmission gearbox, the oil pump motor transmission mechanism comprises a plurality of sets of gear shafts arranged in parallel, mating gears on each set of gear shafts engaging with each other, a second input gear shaft and a second output gear shaft are respectively provided with a second spline and a third spline, and each gear shaft of the oil pump motor transmission mechanism is arranged on the housing of the integrated transmission gearbox through a bearing;

the drive motor is fixed to a lateral side of the integrated transmission gearbox through a mounting bolt on a rear cover of the motor, and an output shaft of the drive motor is connected, through a spline, to the first spline on the first input gear shaft on the drive motor transmission mechanism;

the oil pump motor is fixed to the lateral side of the integrated transmission gearbox through a mounting bolt on a rear cover of the motor, and an output shaft of the oil pump motor is connected, through a spline, to the second spline on the second input gear shaft on the oil pump motor transmission mechanism;

the integrated motor controller is fixedly mounted to an upper side of the drive motor, the oil pump motor and the integrated transmission gearbox;

the oil pump is fixedly mounted to the lateral side of the integrated transmission gearbox, and an input shaft of the oil pump is connected, through a spline, to the third spline on the second output gear shaft on the oil pump motor transmission mechanism;

the vehicle controller is fixedly mounted to an upper cover of the integrated motor controller, and the vehicle controller is electrically connected to the integrated motor controller by wire harness; and the integrated transmission gearbox is provided with a mounting flange plate, a first bolt hole and a second bolt hole.

2. The liquid-cooled integrative power system for electric forklift according to claim 1, wherein the integrated motor controller comprises a drive motor controller and an oil pump motor controller; a three-phase terminal of the drive motor controller and a three-phase terminal on the rear cover of the drive motor are directly connected inside a housing of the integrated motor controller through a copper bar; a low-voltage signal terminal of the drive motor controller and a low-voltage signal terminal on the rear cover of the drive motor are directly connected inside the housing of the integrated motor controller through a mating plug-in connector; a three-phase terminal of the oil pump motor controller and a three-phase terminal on the rear cover of the oil pump motor are directly connected inside the housing of the integrated motor controller through a copper bar; and a low-voltage signal terminal of the oil pump motor controller and a low-voltage signal terminal on the rear cover of the oil pump motor are directly connected inside the housing of the integrated motor controller through a mating plug-in connector.

3. The liquid-cooled integrative power system for electric forklift according to claim 1, wherein the mounting flange plate is fixedly connected to a gear casing and a mounting surface on a forklift drive axle housing, and the first bolt hole and the second bolt hole are fixedly connected to a support on a forklift body.

4. The liquid-cooled integrative power system for electric forklift according to claim 1, wherein a first heat-dissipation water channel is arranged inside a housing of the drive motor, and a first water inlet and a first water outlet of the first heat-dissipation water channel are arranged on the rear cover of the drive motor; a second heat-dissipation water channel is arranged inside a housing of the oil pump motor, a second water outlet of the second heat-dissipation water channel is arranged on the rear cover of the motor, and a second water inlet of the second heat-dissipation water channel is arranged on a front cover of the motor; a third heat-dissipation water channel is arranged at a bottom of the integrated motor controller, and a third water inlet and a third water outlet of the third heat-dissipation water channel are arranged on one side of the integrated motor controller; the third water outlet on the side of the integrated motor controller and the second water inlet on the front cover of the oil pump motor are connected through a first heat-dissipation pipeline, and the second water outlet on the rear cover of the oil pump motor and the first water inlet on the rear cover of the drive motor are connected through a second heat-dissipation pipeline; the third water inlet on the side of the integrated motor controller and a water outlet of an external cooling system are connected through a third heat-dissipation pipeline; and the first water outlet on the rear cover of the drive motor and a water inlet of the external cooling system are connected through a fourth heat-dissipation pipeline.

5. The liquid-cooled integrative power system for electric forklift according to claim 1, wherein the drive motor transmission mechanism comprises the first input gear shaft, a second shaft, a third shaft and a first output shaft arranged in parallel; the first input gear shaft, the second shaft, the third shaft and the first output shaft are all fixedly mounted on the housing of the integrated transmission gearbox through bearings; the first input gear shaft is fixedly connected with a input shaft gear, the second shaft is fixedly connected with a first-stage reduction driven gear and a second-stage reduction driving gear, the third shaft is fixedly connected with a second-stage reduction driven gear and a third-stage reduction driving gear, and the first output shaft is fixedly connected with a third-stage reduction driven gear; the input shaft gear engages the first-stage reduction driven gear in a transmission manner, the second-stage reduction driving gear engages the second-stage reduction driven gear in a transmission manner, and the third-stage reduction driving gear engages the third-stage reduction driven gear in a transmission manner; the first input gear shaft is provided with the first spline, and the first output shaft is provided with the differential.

6. The liquid-cooled integrative power system for electric forklift according to claim 1, wherein the oil pump motor transmission mechanism comprises the second input gear shaft and the second output gear shaft arranged in parallel; the second input gear shaft and the second output gear shaft are both fixedly mounted on the housing of the integrated transmission gearbox through bearings; the second input gear shaft is fixedly connected with an input shaft gear, and the second output gear shaft is fixedly connected with an output shaft gear; the input shaft gear engages the output shaft gear in a transmission manner; and the second input gear shaft and the second output gear shaft are respectively provided with the second spline and the third spline.

7. A forklift, comprising the liquid-cooled integrative power system for electric forklift according to claim 1.

* * * * *